April 7, 1970   J. C. CRONIN ET AL   3,505,597
CORONA TESTING APPARATUS INCLUDING AN OSCILLOSCOPE AND
MECHANICAL TO ELECTRICAL TRANSDUCERS HAVING
SIGNAL ISOLATING MEANS THEREBETWEEN
Filed Dec. 13, 1967

WITNESSES:
Bernard R. Gieguay
James T. Young

INVENTORS
Paul Narbut and
John C. Cronin.
BY
Donald R. Lackey
ATTORNEY

United States Patent Office 3,505,597
Patented Apr. 7, 1970

---

3,505,597
CORONA TESTING APPARATUS INCLUDING AN OSCILLOSCOPE AND MECHANICAL TO ELECTRICAL TRANSDUCERS HAVING SIGNAL ISOLATING MEANS THEREBETWEEN
John C. Cronin and Paul Narbut, Sharpsville, Pa., assignors to Westinghouse Electric Corporation, Pittsburgh, Pa., a corporation of Pennsylvania
Filed Dec. 13, 1967, Ser. No. 690,298
Int. Cl. G01r 31/00
U.S. Cl. 324—72    10 Claims

ABSTRACT OF THE DISCLOSURE

Apparatus for the detection and location of corona within the casing of fluid filled electrical apparatus. A plurality of mechanical to electrical transducers are disposed in predetermined spaced relation with one another, to pickup corona initiated mechanical vibrations in the apparatus to be tested, and the outputs of the transducers are connected to a multitrace oscilloscope. The transducer which first receives the corona initiated vibration initiates the horizontal sweep circuits of each of the traces, with the time between the start of the vertical deflections of any two of the traces indicating the difference between the distances separating the two vibration responsive locations from the source of the corona.

BACKGROUND OF THE INVENTION

Field of the invention

The invention relates in general to electrical inductive apparatus, such as transformers, and more particularly, to the detection and location of the source of corona discharges within such apparatus.

Description of the prior art

Corona testing high voltage, liquid filled electrical inductive apparatus, such as transformers and reactors, is desirable, as it may locate weak points or faults in the insulation system which may cause partial breakdowns in the insulation, with an accompanying energy dissipation which ionizes the surrounding insulation. Corona testing thus may locate incipient faults which allow the apparatus to pass conventional tests, but which may cause complete breakdown of the insulation at some future time.

The corona test must not only indicate the presence of corona in the liquid immersed windings, but it should provide some means for pin pointing its location. A prior art corona testing method, for detecting and locating corona, uses both the electrical signal provided by the corona discharge, and a signal responsive to the mechanical vibrations produced in the liquid by pressure changes in the liquid induced by the corona discharge. The electrical signal is used to trigger the horizontal sweep of a cathode ray oscilloscope, and the mechanical vibrations are used to provide an electrical signal which is picked up by a suitably located mechanical to electrical transducer, which has its electrical output connected to the vertical deflection terminal of the oscilloscope. The time between the start of the trace and the start of the vertical deflection indicates the distance from the corona discharge to the pickup or transducer. Moving the pickup and repeating the cycle, allows the approximate location of the discharge to be located by triangulation.

This prior art method is practical, as long as the electrically transmitted pulse, which triggers the horizontal sweep of the oscilloscope, has sufficient energy content to provide a vertical deflection on the scope. It is the nature of corona discharges, however, to provide some electrical pulses which are of sufficient magnitude to trigger the horizontal sweep of the oscilloscope, but which have insufficient energy content to provide mechanical vibrations useful for the initiation of the vertical deflection of the scope trace. Thus, this prior art method is subject to faulty triggering, with the probability of triggering to yield the desired information being small.

Summary of the invention

Briefly, the present invention overcomes the faulty triggering of the prior art by utilizing a plurality of strategically disposed mechanical to electrical transducers, each connected to a different vertical deflection terminal of a miltitrace cathode ray oscilloscope, and each connected through impedance means to the trigger terminal for the horizontal sweep of the oscilloscope. The transducer located closest to the source of the corona discharge triggers the horizontal sweep of all of the traces, and the traces will record when the sound reaches their associated transducer. The time delay between the arrival of the energy pulse at any two of the transducers, as indicated by a suitably calibrated oscilloscope, represents the difference between the distance separating the two transducers from the source of the corona discharge. Triangulation may be used to locate the approximate location of the corona discharge.

Brief description of the drawings

Further advantages and uses of the invention will become more apparent when considered in view of the following detailed description and drawings, in which.

Description of the preferred embodiments

Figure 1:
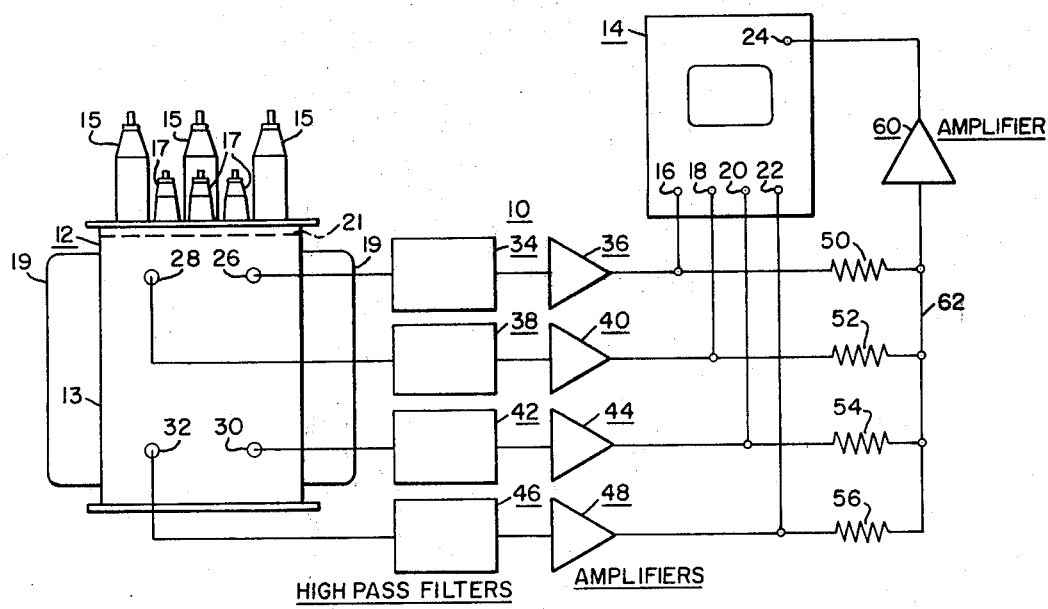
FIGURE 1 is a block diagram of corona test apparatus constructed according to an embodiment of the invention.

Referring now to the drawings, and FIG. 1 in particular, there is shown corona test apparatus 10 constructed according to an embodiment of the invention, for testing high voltage inductive apparatus, such as transformer 12. Transformer 12 may be of any conventional type, having a casing 13, high and low voltage bushing assemblies 15 and 17, respectively, and electrical windings (not shown) disposed within the casing 13 and immersed in a fluid insulating and/or cooling dielectric, such as oil. The level of the fluid is indicated generally with a dotted line 21, and the transformer 12 may include heat exchanger means 19, if desired, for cooling the fluid.

Corona test apparatus 10, in this embodiment, includes a multitrace oscilloscope 14, having, for example, four traces, each of which has a separate vertical deflection or Y-axis input terminal, such as terminals 16, 18, 20 and 22, respectively, and having a trigger terminal 24 for simultaneously initiating the horizontal sweep of each of the traces, with a common calibrated time base.

Each of the vertical deflection input terminals is connected to a different mechanical to electrical type transducer, such as a microphone, with input terminal 16 being connected to a transducer 26, input terminal 18 being connected to a transducer 28, input terminal 20 being connected to a transducer 30, and input terminal 22 being connected to a transducer 32. Transducers 26, 28, 30 and 32 are disposed in predetermined spaced relation with one aonther, in mechanical vibration responsive association with transformer 12. When corona discharges are produced in the windings of transformer 12, either when the windings are energized with their rated potential, or when the windings are surge tested, some of the discharges may dissipate sufficient energy to cause significant high frequency pressure changes within the insulating fluid. These pressure changes cause high frequency mechanical vibrations which may be picked up by the transducers, by either disposing them within the insulating fluid, or by placing them in contact with the casing 13 of the transformer 12.

In order to separate the portion of the electrical output signal from a transducer which is responsive to corona induced mechanical vibrations, from that portion of the transducer output signal responsive to normal background noise in energized electrical apparatus, each electrical output signal is passed through a high pass filter and the output signal of the high pass filter is amplified to a magnitude usable by the cathode ray oscilloscope 14. More specifically, transducer 26 is connected to terminal 16 through high pass filter means 34 and amplifier means 36, transducer 28 is connected to terminal 18 through high pass filter means 38 and amplifier means 40, transducer 30 is connected to terminal 20 through high pass filter means 42 and amplifier means 44, and transducer 32 is connected to terminal 22 through high pass filter means 46 and amplifier means 48.

High pass filters 34, 38, 42 and 46 may be of conventional construction, utilizing inductors and capacitors connected and arranged to pass signals having a frequency above 25 kc. Thus, the background noise will be removed from the signal without affecting the corona responsive portion.

The amplifiers 36, 40, 44 and 48 may also be of conventional construction, and as will be hereinafter explained, should have a relatively low output impedance.

In addition to conencting each of the transducers 26, 28, 30 and 32 to the vertical deflection terminals 16, 18, 20 and 22, respectively, each of the transducers are also connected to the trigger terminal 24 through their associated high pass filters and amplifiers. Since all of the transducers are connected in common at trigger terminal 24, the circuit for selecting the first signal to be applied to terminal 24 must isolate the signals and prevent them from being reflected back into the other circuits connected to the terminal. Any reflection of a signal from one of the transducer circuits into the circuit of the other transducers would appear at the vertical deflection input terminal of these other circuits and cause a false deflection.

The selection and isolation of the signals applied to trigger terminal 24 is accomplished by connecting each transducer to terminal 24 through its associated high pass filter and amplifier means, and also through an impedance means of relatively high magnitude. Thus, transducer 26 is connected to terminal 24 through high pass filter 34, amplifier 36, and an impedance means such as resistor 50. In like manner, transducer 28 is connected to terminal 24 through high pass filter means 38, amplifier means 40, and resistor 52. Transducer 30 is connected to terminal 24 through high pass filter means 42, amplifier means 44, and resistor 54. Transducer 32 is connected to terminal 24 through high pass filter means 46, amplifier means 48, and resistor 56.

An additional stage of amplification, represented by amplifier 60, may be connected between the common connection of resistors 50, 52, 54 and 56 at conductor 62, and the trigger terminal 24. Amplifier 60 may be similar to amplifiers 36, 40, 44 and 48.

By selecting amplifiers 36, 40, 44 and 48 to have a relatively low output impedance, and by selecting resistors 50, 52, 54 and 56 to have a relatively high impedance, any signal applied to the common conductor 62 by one of the transducers, will be attenuated in each of the circuits of the other transducers by the ratio of the output impedance of the amplifier to the impedance of the resistor. Amplifiers having an output impedance of 2 ohms, and resistors having a value of 150,000 ohms, were successfully used in corona testing apparatus constructed according to the teachings of the invention. However, the values may vary over a considerable range, with the important criterion being that the output impedance of the amplifiers 36, 40, 44 and 48 must be low compared to the value of resistors 50, 52, 54 and 56.

Oscilloscope 14 should have a one-shot trigger for the horizontal sweep of the various traces. Thus, the first transducer to pickup a mechanical vibration responsive to a corona discharge within transformer 12 will be applied through its associated high pass filter, amplifier, resistor, and through trigger amplifier 60, to the trigger terminal 24, which will indicate the horizontal sweep for each trace of the oscilloscope. The trace associated with the transducer which first received the corona responsive vibrations will have a vertical deflection starting at the start of the trace, and the vertical deflection of the other traces will start when their associated transducer receives the mechanical vibrations. The traces may be photographically recorded, and by using calibrated traces, the distances separating the starts of the vertical deflections of any two traces will indicate the difference between the distances separating the two transducers associated with these two traces, form the source of the corona discharge.

Figure 2:
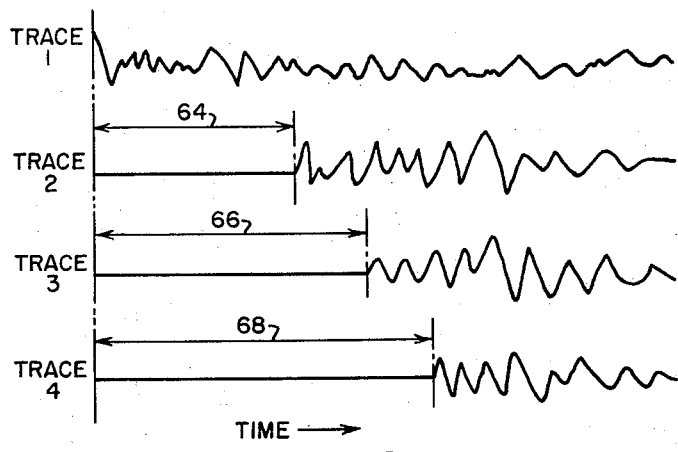
FIG. 2 is a chart which illustrates typical oscilloscope traces obtainable with the corona test apparatus shown in FIG. 1.

FIG. 2 shows a typical scope trace pattern for a 4 trace scope connected to four spaced transducers disposed, for example, as illustrated on the side of casing 13 of transformer 12. Trace 1 of FIG. 2 may be responsive to vertical deflection terminal 16 and transducer 26, trace 2 may be responsive to vertical deflection terminal 18 and transducer 28, trace 3 may be responsive to vertical deflection terminal 20 and transducer 30, and trace 4 may be responsive to vertical deflection terminal 22 and transducer 32. In this specific example, assume that transducer 26 was the first to receive the corona initiated mechanical vibrations, triggering the horizontal sweep of the traces. Trace 1 exhibits a deflection at the start of the horizontal sweep, confirming that transducer 26 was the closest to the corona discharge. Traces 2, 3 and 4 exhibit vertical deflections at the times indicated by distances 64, 66 and 68, respectively. In this example, traces 2, 3 and 4 are all compared with trace 1, but it will be understood that the time between the start of the vertical deflections of any two traces may be used in determining the location of the corona discharge. By using a calibrated scale, for example a scale calibrated 50 microseconds per centimeter, and knowing the speed of sound in the particular fluid or liquid disposed in the casing 13, triangulation may be used to locate the source of the corona discharge.

The corona detecting and locating apparatus 10 shown in FIG. 1 possesses many advantages over prior art corona detecting apparatus. For example, faulty triggering is eliminated. Only corona responsive signals of sufficient energy content to provide a recognizable vertical deflection of the oscilloscope will trigger the horizontal sweep of the scope. Further, only one type of signal is used, with all of the signals being from a transducer or microphone output. This simplifies the setup and eliminates the making of capacitor pickups for receiving electrical energy from the transformer bushings, and it thus eliminates any error which may be due to electrical disturbances in the circuitry external to the transformer. Also, the corona detecting and locating apparatus disclosed herein, with its isolating "first signal" selection circuit, allows any desired number of transducers to be used, and thus allows the obtaining of complete information for locating a corona discharge with a single test of the transformer.

While the corona test apparatus 10 has the flexibility of being able to obtain complete information with one test, it should not be limited to this preferred embodiment. The minimum apparatus required for following the teachings of the invention is two transducers, along with their associated high pass filters, amplifiers, and resistors, and an oscilloscope having a single trace, a single vertical deflection input terminal, and a one-shot trigger input terminal. The two transducers are located as hereinbefore described, either within the fluid of the apparatus to be tested, or in contact with its casing, and one of the transducers is connected to the single vertical deflection input terminal, as hereinbefore described relative to FIG. 1. The apparatus 12 is energized, and if the transducer connected to the vertical deflection input terminal is closer to the corona discharge than the other transducer, the trace will indicate this by having a vertical deflection which starts when the trace starts. Thus, this transducer would be disconnected from the vertical deflection input terminal, and the other transducer would be connected thereto. The equipment would again be tested, and the trace this time will start in response to a signal from the transducer which is not connected to the vertical deflection input terminal, and the vertical deflection will start in response to a signal from the transducer which is connected thereto. The difference in the time from the start of the trace to the start of the vertical deflection will indicate the difference between the distances separating the two transducers from the source of the corona discharge. If additional information is required, the transducers may be rearranged, and apparatus 12 again energized or tested to record another corona discharge.

Instead of having two transducers and a single trace scope, any number of transducers may be used with a single trace scope, and the electrical apparatus could be tested as many times as there are transducers, with a different transducer being connected to the vertical deflection input terminal each time.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

We claim:

1. Apparatus for corona testing electrical inductive apparatus having a casing containing electrical windings disposed in a fluid, comprising:
   first means including a plurality of mechanical to electrical transducers adapted to be disposed at a plurality of predetermined spaced locations which are in vibration responsive association with the electrical apparatus,
   an oscilloscope having at least one trace and at least one vertical deflection input terminal, and a trigger input terminal for initiating the horizontal sweep of said at least one trace,
   second means including high pass filter means, amplifier means, and impedance means, respectively connected between each of said transducers and said trigger input terminal, the magnitude of said impedance means, relative to the magnitude of the output impedance of said amplifier means, being selected to isolate a signal applied to said trigger input terminal by a transducer, from the circuits connected between the other transducers and said trigger input terminal,
   and third means connecting the output of the amplifier means associated with a predetermined transducer to said at least one vertical deflection input terminal, with the first corona responsive electrical signal to be applied to said trigger input terminal initiating the horizontal sweep of said at least one trace, and with the time between the start of the trace and the start of a vertical deflection on the trace indicating the difference between the distances separating the transducer which triggered the horizontal sweep and the transducer connected to said vertical deflection input terminal, from the source of the corona discharge.

2. The apparatus of claim 1 wherein at least one of the transducers is adapted to be disposed within the fluid disposed in the casing of the electrical inductive apparatus to be tested.

3. The apparatus of claim 1 wherein at least one of the transducers is adapated to be disposed in contact with the casing of the electrical apparatus to be tested.

4. The apparatus of claim 1 wherein the magnitude of the impedance means is large relative to the magnitude of the output impedance of the amplifier means.

5. The apparatus of claim 1 including a trigger amplifier connected between the trigger input terminal and each impedance means.

6. Apparatus for corona testing electrical inductive apparatus having a casing containing electrical windings disposed in a fluid, comprising:
   first means includng a plurality of mechanical to electrical transducers adapted to be disposed at a plurality of spaced locations which are in vibration responsive association with the electrical inductive apparatus,
   a multitrace oscilloscope having a vertical deflection input terminal for each trace, and a single trigger input terminal for simultaneously initiating the horizontal sweep circuits of each of the traces,
   second means including high pass filter means, amplifier means, and impedance means, respectively connected between each of said transducers and said trigger input terminal, the magnitude of said impedance means, relative to the magnitude of the output impedance of said amplifier means, being selected to isolate a signal applied to said trigger input terminal by a transducer, from the circuits connected between the other transducers and said trigger input terminal,
   and third means connecting the output of each amplifier means to a different vertical deflection input terminal, with the first corona responsive electrical signal to be applied to said trigger input terminal initiating the horizontal sweep of each of the traces of said oscilloscope, and with the time between the start of the vertical deflections of any two traces indicating the difference between the distances separating the transducers associated with the selected traces, from the source of the corona discharge.

7. The apparatus of claim 6 wherein at least one of the transducers is adapted to be disposed within the fluid disposed in the casing of the electrical inductive apparatus to be tested.

8. The apparatus of claim 6 wherein at least one of the transducers is adapted to be disposed in contact with the casing of the electrical inductive apparatus to be tested.

9. The apparatus of claim 6 wherein the magitude of the output impedance means is large relative to the magnitude of the output impedance of the amplifier means.

10. The apparatus of claim 6 including a trigger amplifier connected between the trigger input terminal and each impedance means.

References Cited

UNITED STATES PATENTS

| 2,932,002 | 4/1960 | Keiser | 340—16 |
| 3,173,086 | 5/1965 | Kresge | 324—52 |

RUDOLPH V. ROLINEC, Primary Examiner

E. L. STOLARUN, Assistant Examiner

U.S. Cl. X.R.

73—71.4; 324—54, 121; 340—6